(12) United States Patent
Thompson et al.

(10) Patent No.: US 8,521,545 B2
(45) Date of Patent: Aug. 27, 2013

(54) PROPERTY SALE APPLICATION AND TRACKING SYSTEM

(75) Inventors: Whit Thompson, Oakland Park, FL (US); Henrique Meyer, Fort Lauderdale, FL (US); Lloyd E. McClendon, III, Plantation, FL (US); Douglas McClendon, Davie, FL (US)

(73) Assignee: RealAuction.com, LLC, Plantation, FL (US)

( * ) Notice: Subject to any disclaimer, the term of this patent is extended or adjusted under 35 U.S.C. 154(b) by 1183 days.

(21) Appl. No.: 11/683,752

(22) Filed: Mar. 8, 2007

(65) Prior Publication Data
US 2008/0222014 A1 Sep. 11, 2008

(51) Int. Cl.
*G06Q 10/00* (2012.01)
(52) U.S. Cl.
USPC .......................................................... 705/1.1
(58) Field of Classification Search
USPC .......................................................... 705/1.1
See application file for complete search history.

(56) References Cited

U.S. PATENT DOCUMENTS

| | | | |
|---|---|---|---|
| 3,581,072 A | 5/1971 | Nymeyer | |
| 4,674,044 A | 6/1987 | Kalmus et al. | |
| 4,799,156 A | 1/1989 | Shavit et al. | |
| 5,243,515 A | 9/1993 | Lee | |
| 5,794,219 A | 8/1998 | Brown | |
| 5,802,501 A | 9/1998 | Graff | |
| 5,835,896 A | 11/1998 | Fisher et al. | |
| 5,890,138 A | 3/1999 | Godin et al. | |
| 5,905,975 A | 5/1999 | Ausubel | |
| 5,966,699 A | 10/1999 | Zandi | |
| 6,023,686 A | 2/2000 | Brown | |
| 6,026,383 A | 2/2000 | Ausubel | |
| 6,076,064 A * | 6/2000 | Rose, Jr. | 705/28 |
| 6,161,099 A | 12/2000 | Harrington et al. | |
| 6,167,384 A | 12/2000 | Graff | |
| 6,167,386 A | 12/2000 | Brown | |
| 6,192,347 B1 | 2/2001 | Graff | |
| 6,202,051 B1 | 3/2001 | Woolston | |
| 6,684,196 B1 * | 1/2004 | Mini et al. | 705/26 |
| 6,760,709 B2 | 7/2004 | Graff | |
| 6,850,902 B1 * | 2/2005 | Finch | 705/28 |
| 6,901,384 B2 | 5/2005 | Lynch et al. | |
| 6,938,009 B1 | 8/2005 | Herbst et al. | |
| 7,406,440 B2 * | 7/2008 | Napier et al. | 705/26 |
| 7,523,063 B2 | 4/2009 | Harrington et al. | |
| 7,548,884 B1 * | 6/2009 | Thomas | 705/38 |
| 7,720,688 B1 * | 5/2010 | Baron et al. | 705/313 |

(Continued)

*Primary Examiner* — Naresh Vig
(74) *Attorney, Agent, or Firm* — Akerman Senterfitt

(57) ABSTRACT

A property sate application system, such as for a tax deed, is provided that receives sale applications. The tax deed application can include information associated with a parcel, certificate information associated with a tax certificate associated with the parcel, and investor information associated with an investor associated with the at least one tax certificate. The system can enter data representative of the application into a database, transmit the application for review, and retrieve parcel information related to the identification information, the certificate information, or the investor information. The system may update the application data in the tax deed database based at least in part on the parcel information, receive a title search request based at least in part on the parcel information, transmit the title search request for processing, provide a status identifier representative of a current status of the tax deed application, and update the status identifier.

19 Claims, 17 Drawing Sheets

(56) References Cited

U.S. PATENT DOCUMENTS

| | | |
|---|---|---|
| 2002/0073006 A1 | 6/2002 | Goldman |
| 2002/0128941 A1 | 9/2002 | Champion et al. |
| 2003/0036922 A1* | 2/2003 | Fries .................. 705/1 |
| 2003/0236727 A1 | 12/2003 | Champion et al. |
| 2005/0038726 A1 | 2/2005 | Salomon et al. |
| 2005/0108136 A1 | 5/2005 | Schneider |
| 2005/0131789 A1 | 6/2005 | Mintz |
| 2005/0159963 A1* | 7/2005 | Gotschall .................. 705/1 |
| 2005/0209867 A1* | 9/2005 | Diesch et al. .................. 705/1 |
| 2005/0209873 A1* | 9/2005 | Anastasi .................. 705/1 |
| 2005/0210068 A1* | 9/2005 | Szymanski et al. ........ 707/104.1 |
| 2006/0020541 A1* | 1/2006 | Gommlich .................. 705/40 |
| 2006/0197763 A1 | 9/2006 | Harrison et al. |
| 2006/0208061 A1 | 9/2006 | Carragher |

* cited by examiner

FIG. 13

QUOTE

HOME | ABOUT US | SITE MAP | FAQ | CONTACT US | LOGOUT

APPLICATION | QUOTES | SETUP | SEARCH | MY ACCOUNT
COUNTY

WELCOM DOUG BELDEN
✉ YOU HAVE 1 UNREAD MESSAGES (1) SELECT BIDDER NUMBERS — (2) SELECT PAYMENT MONTH — (3) SELECT CERTIFICATES — (4) QUOTE SUMMARY — (5) SAVE & PRINT QUOTE

MONTH: MARCH

TOTAL CERTIFICATES: 23
TOTAL FACE AMOUNT: $8,184.54

SELECTED: 6
TOTAL: $548,214.58

*INTEREST EARNED TO DATE IS LESS THAN 5%. INTEREST CALCULATED USING FLORIDA'S 5% RULE.

CERTIFICATES PER PAGE: 100 »  [CHECK ALL] [NEXT]

| 2002 | 1705  |    | 014489-0000 | $407.25   | 9%  | $174.10    | $654.39     | $370.64  | $2,504.40   | ☐ |
| 2000 | 3043  |    | 027569-0000 | $4,678.48 | 18% | $5,611.78  | $10,288.26  | $9,321.67| $535,824.03 | ⊘ |
| 2002 | 4762  |    | 043012-0000 | $333.25   | 17% | $284.93    | $618.18     | $365.18  | $4,245.48   | ☐ |
| 2002 | 5279  |    | 047359-5100 | $543.98   | 17% | $439.26    | $983.24     | $1,131.92| $4,705.05   | ⊘ |
| 2000 | 20073 |    | 206946-8000 | $77.96    | 18% | $93.55     | $171.51     | $236.17  | $1,416.15   | ⊘ |
| 2003 | 62681 |    | 016981-0000 | $226.27   | 15% | $127.28    | $353.55     | $366.96  | $3,489.47   | ⊘ |
| 2003 | 63699 |    | 012388-0000 | $154.48   | 21% | $63.72     | $218.20     | $455.72  | $2,986.27   | ⊘ |
| 2003 | 63700 | HX | 032389-0000 | $211.26   | 8%  | $63.38     | $274.64     | $78.65   | $1,253.27   | ⊘ |

FIG. 14

DATE PREPARED: 02/08/2007
PREPARED BY : DOUG BELDEN

2600

BIDDER NUMBER: 115
BUYER NAME: ANTOINETTE V ZABALDO

| CERT. YEAR | CERT. NUMBER | HX | PARCEL ID NUMBER | FACE AMOUNT | INTEREST RATE (%) | INTEREST EARNED THROUGH 3/31/07 | 5% MIN. | CERTIFICATE TOTAL | TAXES DUE | AMOUNT REQUIRED |
|---|---|---|---|---|---|---|---|---|---|---|
| 2000 | 87 | | 001308-9999 | $81.65 | 1800.00 | $97.98 | | $179.63 | $0.00 | $235.00 |
| 2002 | 4024 | | 036110-0100 | $739.53 | 1800.00 | $632.30 | | $1,371.83 | $820.11 | $7,870.32 |
| 2003 | 63768 | | 032664-0050 | $358.05 | 1700.00 | $228.26 | | $586.31 | $349.93 | $1,944.63 |
| 2003 | 66329 | | 058117-4098 | $559.47 | 1000.00 | $209.80 | | $769.27 | $2,080.73 | $7,522.37 |
| 2003 | 69508 | | 080431-0000 | $15.56 | 800.00 | $4.67 | | $20.23 | $0.00 | $334.83 |
| 2003 | 74671 | | 154562-0000 | $816.45 | 1000.00 | $306.17 | | $1,122.62 | $337.50 | $3,444.79 |
| | | | | $2,570.71 | | $1,479.18 | | $4,049.89 | $3,588.27 | $21,351.88 |

BIDDER NUMBER: 272
BUYER NAME: CHERYL D FERRELL

| CERT. YEAR | CERT. NUMBER | HX | PARCEL ID NUMBER | FACE AMOUNT | INTEREST RATE (%) | INTEREST EARNED THROUGH 3/31/07 | 5% MIN. | CERTIFICATE TOTAL | TAXES DUE | AMOUNT REQUIRED |
|---|---|---|---|---|---|---|---|---|---|---|
| 2002 | 8659 | | 073833-0758 | $74.57 | 1800.00 | $63.76 | | $138.33 | $0.00 | $781.39 |
| | | | | $74.57 | | $63.76 | | $138.33 | $0.00 | $781.39 |

BIDDER NUMBER: 293
BUYER NAME: KIMBERLY KIM

| CERT. YEAR | CERT. NUMBER | HX | PARCEL ID NUMBER | FACE AMOUNT | INTEREST RATE (%) | INTEREST EARNED THROUGH 3/31/07 | 5% MIN. | CERTIFICATE TOTAL | TAXES DUE | AMOUNT REQUIRED |
|---|---|---|---|---|---|---|---|---|---|---|
| 2003 | 63086 | | 022198-0000 | $131.71 | 1800.00 | $88.90 | | $220.61 | $313.60 | $961.26 |
| | | | | $131.71 | | $88.90 | | $220.61 | $313.60 | $961.26 |

BIDDER NUMBER: 347
BUYER NAME: TAXVEST LTD PARTNERSHIP

| CERT. YEAR | CERT. NUMBER | HX | PARCEL ID NUMBER | FACE AMOUNT | INTEREST RATE (%) | INTEREST EARNED THROUGH 3/31/07 | 5% MIN. | CERTIFICATE TOTAL | TAXES DUE | AMOUNT REQUIRED |
|---|---|---|---|---|---|---|---|---|---|---|
| 2002 | 66 | | 000519-1200 | $4,056.73 | 700.00 | $1,348.86 | | $5,405.59 | $2,617.60 | $11,851.13 |
| 2002 | 188 | | 002546-0000 | $2,723.86 | 700.00 | $905.68 | | $3,629.54 | $4,975.74 | $5,210.74 |
| 2001 | 1022 | | 005486-0000 | $4,962.44 | 1000.00 | $2,812.05 | | $7,774.49 | $746.41 | $13,290.33 |
| 2001 | 1544 | Y | 012105-0000 | $3,176.41 | 1100.00 | $1,979.96 | | $5,156.37 | $2,963.12 | $3,198.12 |
| 2002 | 16410 | | 152234-0000 | $804.79 | 1700.00 | $649.87 | | $1,454.66 | $458.24 | $4,433.87 |
| 2002 | 16729 | | 154450-0000 | $751.67 | 1700.00 | $606.97 | | $1,358.64 | $377.33 | $1,709.83 |

*FIG. 17*

PROPERTY SALE APPLICATION AND TRACKING SYSTEM

BACKGROUND OF THE INVENTION

1. Field of the Invention

The present invention relates to a computer implemented system for encumbered property sale applications, and more particularly to a system for management and processing of such applications.

2. Related Art

Property owners are required to pay properly taxes on an annual basis to their local tax collector. When owners neglect to pay taxes due within a predetermined amount of time, a tax certificate is sold by the local tax collector to an investor. A tax certificate, after lapse of a predetermined amount of time, can provide the investor with a return in the form of interest. In general, the investor may hold the tax certificate for a predetermined period of time, usually between 2 and 7 years. At any time between the second and seventh year, the investor may request a tax deed sale of the parcel to achieve his return.

It is generally known in the art that for an investor to request a tax deed sale to recover the interest, an investor must seek and apply for a fax deed sale on a valid tax certificate. First, the investor has to manually examine the tax certificates in his possession and determine which ones are eligible to apply for and order a tax deed sale. Second, an investor has to determine the amount earned interest and calculate the total amount of monies he is due. This typically requires the investor to contact the tax collector's office to obtain current payoff and interest calculations. Finally, an investor would then have to deliver to the local fax collector's office, in person or by mail, an application for a tax deed sale, including the list of the eligible tax certificates, as well as several other forms, and necessary identification and notarization of signatures.

Once the focal tax collector receives the application from the investor, the local tax collector must review and determine if any of the submitted tax certificates are truly eligible for a tax deed sale. Additionally, the tax collector also has to calculate the interest, to verify the investor's claim. The time period between the investor receiving the calculation and the application fee being received by the county complicates this process. If certificates redeem during this time period, monies may need to be refunded. Furthermore, the tax collector must find any other tax certificates outstanding on the parcel associated with the investor's tax certificate(s). Should the tax collector find additional outstanding certificates on the parcel, the tax collector also has to determine whether the investor owns these additional tax certificates. If another investor owns the tax certificates, the tax collector also has to calculate all monies and interest due the other investor. Once all additional tax certificate totals are calculated, the tax collector has to calculate the preliminary fees and notify the investor of a total amount of fees that must be paid for the application to proceed. Some counties require separate applications for homesteaded properties, and can have different filing requirements for such properties.

The investor generally obtains certified funds and delivers them to the tax collector, usually by mail or hand delivery. However, if sufficient delay occurs between the initial application and the receipt of fees by the tax collector, then any interest on any tax certificates associated with a parcel will have to be recalculated and additionally fees from the investor are necessary. Furthermore, upon receipt of the funds, the tax collector must still go back and verify that the tax debt is still outstanding. If the owner of the parcel associated with a tax certificate pays the outstanding tax bill during this time, then the tax collector has to reject the investor's application and refund the investor's fees. An additional difficulty of the process is where other investors have submitted applications on the same parcel during this time, then the county must make a determination of which application was filed first and issue refunds accordingly.

Generally, when a tax collector has accepted the funds from an investor, they request title commitments from a title company. Typically, the county sends a "Title Request Form" to the title company. The title search and commitment process can generally take between one and eighteen months, if during this time an investor desired to find out the status of the title search and commitment process, the investor would have to contact the local tax collector, who in turn would have to contact the title company to request an update. Once the title company has completed the search, the title company generally sends a tax collector a tax deed search form, including all the lien holders of the parcel.

Upon receipt of the search results from the title company, the tax collector can then order the sale. However, a property owner may still redeem his property by paying all back taxes and costs up until the tax deed is signed by the local authority approving the sale. Afterwards the deed is final. Costs, fees, and any valid liens are paid out of the monies received from the successful bidder. The investor is then reimbursed his monies plus interest earned.

It is generally known in the art that the existing system complicates the application process, resulting in extended time periods between the initial filing of en application and the subsequent sale. This puts the investor at increased risk by allowing the parcel owner additional time to redeem his property by paying the outstanding tax debt. Furthermore, the existing system is inefficient end has not used technology to gain productivity or decrease the complexity of the process. investors do not have the ability to check the real time status of any tax deed sale application. Additionally, the contemporary process burdens the fax payer and/or property owner because interest is accruing while the application is being processed.

Therefore, there is a need for a fax deed application system that minimizes investor risk. There is a further need for such a system that reduces time periods between the various tasks required to issue a tax deed. There is yet a further need for such a system that minimizes the amount of calculations required on the part of investors and tax collectors. There is also a need for such a system that updates parcel data, investor information, and/or tax deed application status. There is additionally a need for such a system that facilitates fee payments, updating of tax collector information, and/or access to parcel information.

SUMMARY OF THE INVENTION

In an exemplary embodiment according to the invention, a method of managing a sale of encumbered property is provided. The method comprises receiving a sale application comprising identification information associated with the encumbered property; entering application data representative of the sale application into a database; transmitting the sale application for review over a network; receiving property information over the network for the encumbered property based at least in part on the review of the sale application; updating the application data in the database based at least in part on the property information; providing a status identifier representative of a current status of the sale application; and updating the stains identifier based at least in part or transmitting the sale application for review, receiving the property information and updating the application data.

In some embodiments, the sale application can be a tax deed application comprising at least one of identification information associated with a parcel, certificate information associated with at least one tax certificate associated with the parcel, and investor information associated with an investor associated with the at least one tax certificate, and wherein the property information is parcel information related to at least one of the identification information, the certificate information and the investor information. In other embodiments, the method can further comprise receiving a title search request based at least in part on the parcel information; transmitting the title search request for processing; receiving a title search result from the processing of the title search request; updating the application data in the database based at least in part on the title search result; and updating the status identifier based at least in part on at least one of receiving the title search request, transmitting the title search request, and receiving the title search result.

In some embodiments, the method may further comprise identifying liens associated with the encumbered property and identifying additional interest and fees associated with the liens, in some embodiments, the method may further comprise communicating with an electronic payment system to process a request for payment of the total fees associated with the sale application; and receiving a notice from the electronic payment system to update the status identifier to include payment information.

In another exemplary embodiment, a system for processing of tax deed applications is provided. The system comprises a user interface; a database for storing tax deed data and a processor. The tax deed data can comprise identification of a parcel and at least one of certificate information for a tax certificate associated with the parcel and investor information for an investor associated with the tax certificate. The processor can be in communication with the user interface and the database. The processor can receive tax deed signals representative of the tax deed data and can store the tax deed data in the database. The processor can transmit: application signals representative of a tax deed application based at least in part on the tax deed data. The processor can receive parcel information signals representative of application changes determined from a review of the tax deed application. The processor can update the tax deed data stored in the database based at least in pad: on the application changes.

In some embodiments, the processor is configured to receive a title search request based at least in part on parcel information and can transmit the title search request for processing. In some embodiments, the processor may be further configured to receive a title search result from the processing of the title search request and may update the application data in the tax deed database based at least in part on the title search result in other embodiments: the processor may be further configured to communicate with an electronic payment system to process a request for payment of the total fees associated with the fax deed application and receive a notice from the electronic payment system to update a status identifier to include payment information. In some embodiments, the processor can be further configured to update the database to include identification of one or more other tax certificates associated with the parcel and identification of additional interest and fees associated with the one or more other tax certificates.

In some embodiments, the status identifier can comprise an identification of total fees associated with the tax deed application to be paid prior to issuance of a tax deed, in other embodiments: the tax deed application may further include identification of interest and fees associated with the at least one fax certificate, in other embodiments, the parcel information can comprise tax information from a tax collector database and/or appraiser information from a property appraiser database.

In yet another exemplary embodiment, a computer readable program embodied in an article of manufacture comprising computer readable program instructions for processing of a fax deed application for a parcel is provided. The program comprises program instructions for causing a computer to store application data representative of the tax deed application; program instructions for causing the computer to transmit the tax deed application for review; program instructions for causing the computer to retrieve parcel information related at least in part to the tax deed application; and program instructions for causing the computer to update the application data based at least in part on the parcel information.

In some embodiments, the program can further comprise program instructions for causing the computer to receive a title search request; program instructions for causing the computer to transmit a title search signal representative of the title search request for performance of a title search for the parcel; program instructions for causing the computer to receive title information determined from the title search; and program instructions for causing the computer to update the application data based at least in part on the title information, in other embodiments, the program may further comprise program instructions for causing the computer to indicate a status identifier representative of a current status of the fax deed application; and program instructions for causing the computer to update the status identifier based on at least one of transmitting the tax deed application for review, retrieving the parcel information, updating the application data, receiving a title search request, transmitting a title search signal, and receiving the title information. In some embodiments, the program can further comprise program instructions for causing the computer to communicate with an electronic payment system to process a request for payment of total fees associated with the tax deed application: and program instructions for causing the computer to receive a notice from the electronic payment system to update the status identifier to include payment information.

In another exemplary embodiment, a method of managing a tax deed sale is provided. The method comprises receiving a request for an application quote for a tax certificate for a parcel; storing in a database tax deed data comprising identification of the parcel and certificate information for the tax certificate associated with the parcel; verifying that the tax certificate is eligible for application based upon the tax deed data; determining tax due on the parcel; determining fees required for the application for the fax certificate; and indicating to a user the application quote based at least in part on the fees.

In another exemplary embodiment, a system for processing a tax deed application is provided. The system comprises: a user interface; a database for storing tax deed data comprising identification of a parcel and certificate information for the tax certificate associated with the parcel; and a processor in communication with the user interface and the database. The processor receives quote signals representative of a request for an application quote for the tax certificate for the parcel. The processor verifies that the tax certificate is eligible for application based upon the tax deed data. The processor determines fees required for the application for the tax certificate. The processor communicates report signals representative of the fees required for the application to the user interface.

Other embodiments, when configured in accordance with the inventive arrangements disclosed herein, can include various other methods or other computer-readable storage medium having computer code for performing the various processes disclosed herein.

DESCRIPTION OF THE DRAWINGS

Figure 13:
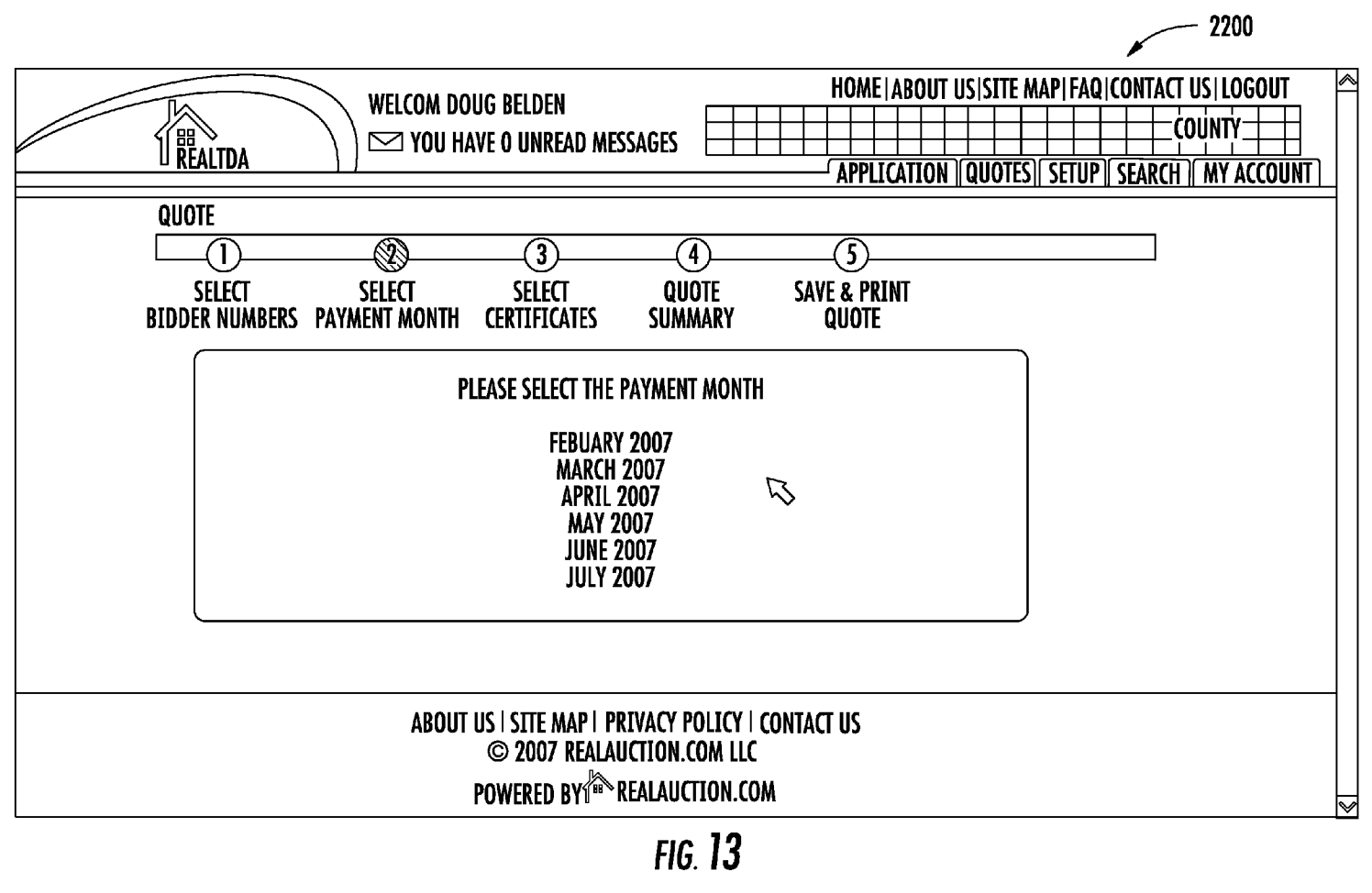

FIG. 13 is a payment month page for the quote utility of FIG. 11.

FIG. 14 is an eligible certificate page for the quote utility of FIG. 11.

FIG. 17 is a quote report generated by the quote utility of FIG. 11.

DETAILED DESCRIPTION OF THE INVENTION

Figure 1:
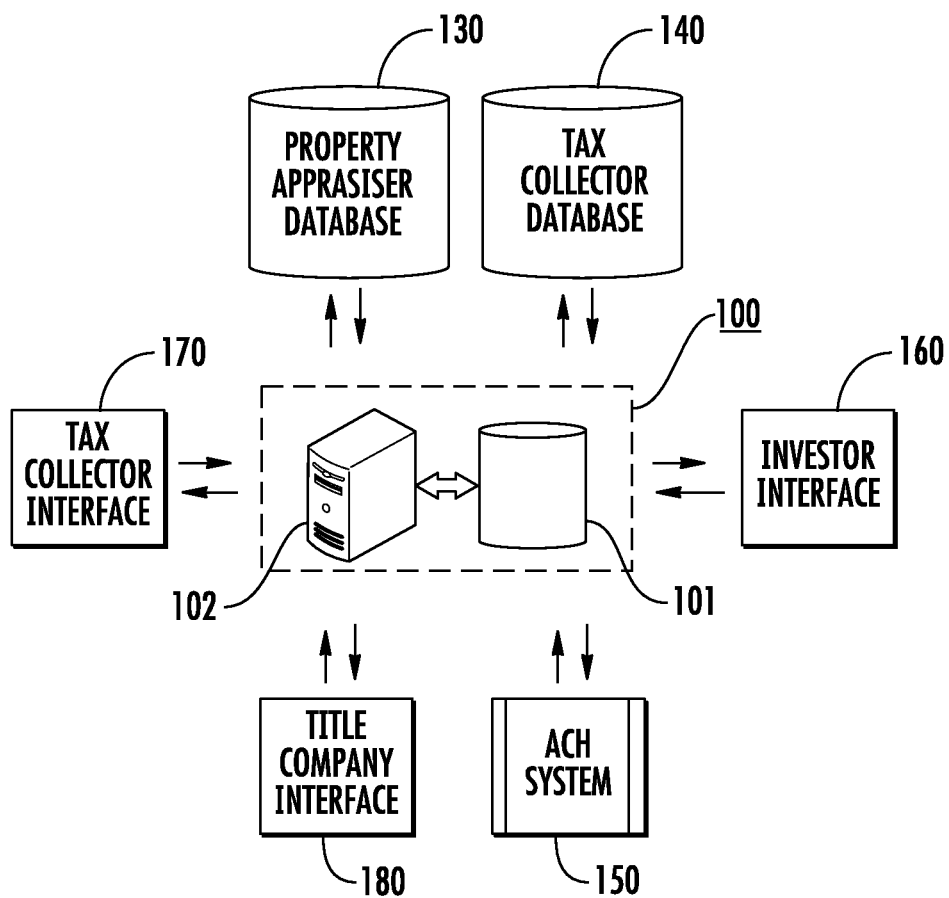
FIG. 1 is a schematic of a system in accordance with an exemplary embodiment of the present invention and associated remote elements.

With reference now to the various figures, a description of the various embodiments of the present invention will now be provided. While the invention is discussed in the context of the illustrated embodiments, it can be appreciated that the invention can include numerous modifications from the presented embodiment. Exemplary embodiments in accordance with the invention can provide a solution for minimizing the risk to investors of tax certificates by improving the normal execution of the tax deed application process, in accordance with one embodiment of the invention, a tax deed application system is configured to manage the tax deed application process and coordinate and manage the activities of the various parties involved. The exemplary embodiment described herein, can reduce the workload of the county staff and reduce the interest burden to the property owner, such as through streamlining.

While the invention will be described with respect to the processing of tax deed applications, it should be appreciated that the invention has application for any other type of lien requiring the interaction of various parties for the lien to mature into an auctioned deed to make good on the debt. The features of the illustrated arrangement of the invention are particularly well adapted for tax deed application process as the invention allows investors, tax collectors, title companies, newspapers, clerks of the court and/or sheriffs offices to process, monitor, and retrieve updated information for tax deed applications. However, the invention is suited for other activities, including real and personal property liens, where coordination of various parties is sought. In these other embodiments, the invention could be adapted for to provide a quick and efficient system to seek permission to auction encumbered property such as to recover debt past due.

It should be understood that the present disclosure uses terms to describe entitles that perform certain function related to fax deed applications but other terms are also contemplated for such entitles. For example, a "Tax Collector" can be the taxing authority in Florida, but other states or countries can use different terms to describe the taxing authority including, Tax Collector, Treasurer, Revenue Collector or Revenue Director. An "Investor" in Florida can be any person or entity holding a valid tax certificate and desiring to make an application, but other states or countries may describe these persons or entities as applicants, bidders, certificate buyers or vendors, A "Title Company" in Florida can be a title research or abstract company, but other states or countries may describe these persons or entitles as attorneys. A Clerk of Court is the judicial branch of the county, in Florida, most applications are processed by the Tax Collector but the properties are legally auctions by the Clerk of the Court. In other states, properties may be disposed of by the faxing authority or "trustees." Other persons or entitles may perform one or more of these functions and the present disclosure encompasses the functions of such other persons or entitles.

FIG. 1 is a basic schematic of an arrangement of elements for a tax deed application system 100 in accordance with the present invention. The system can include a processing unit or controller element 102 configured to handle the various tasks of the tax deed application (TDA) process. The controller element 102 can comprise a computer system within which a set of instructions, when executed, may cause the controller element 102 to perform any one or more of the methodologies of the present invention, in some embodiments, the controller element 102 operates as a stand-alone device. In other embodiments, the controller element 102 may be connected (e.g., using a network) to other computer systems or processors. In some embodiments, the controller element 102 may operate in the capacity of a server or a client user machine in a server-client user network environment, or as a peer machine in a peer-to-peer (or distributed) network environment.

In the various embodiments, the controller element 102 may comprise a server computer, a client user computer, a personal computer (PC), a tablet PC, a laptop computer, a desktop computer, a control system, a network router, switch or bridge, any machine capable of executing a set of instructions (sequential or otherwise) that specify actions to be taken by that machine and any combination thereof. It will be understood that a device of the present disclosure includes broadly any electronic device that provides data communication. Further, while a single machine is illustrated, the term "machine" shall also be taken to include any collection of machines that individually or jointly execute a set (or multiple sets) of instructions to perform any one or more of the methodologies discussed herein.

In the various embodiments, the tax deed application system 100 can further include a mass storage system 101 for storage of the data of the central warehouse system. It can be appreciated that in the various embodiments, the mass storage system 101 can comprise one or more mass storage devices, operating together or independently. In single or multiple locations, where the controller element 102 is coupled to, or otherwise in communication with, the mass storage system 101 directly or through a network connection, either wired or wirelessly.

In the various embodiments, the mass storage system 101 can be configured to store single or multiple databases of information regarding TDA's and associated information. For example, along with TDA information end TDA status, the mass storage system may be used to store other pertinent information, including, but not limited to, tax collector information, title company information, parcel information, investor information, electronic payment information, and title search result information. It can be appreciated that in some embodiments, such information may be stored within the mass storage system 101 or accessed through a remote connection. For example, detailed parcel information may not be stored completely on the mass storage device 101, instead a link may be provided to access information directly from the county property appraiser database 130 or the county tax collector database 140, as illustrated in FIG. 1. However, the invention is not limited in tills regard and it is contemplated that any combination of locally stored and remotely stored information can also be used in the various embodiments.

In some embodiments, access to other systems outside the TDA system 100 may also be provided. For example, electronic payment methods are contemplated in this disclosure. Therefore, in some embodiments, communication may be provided with an automatic clearing house (ACH) 150 or other electronic payment provider, in some embodiments, access is provided by direct access to the ACH system 150 within a module of the controller element 102. In other embodiments, the controller element 102 may transfer a user to an interface of the ACH system 150 to provide payment information for one of more TDA's, in such embodiments. It is contemplated that an interface may be implemented using a stand-alone program or through a client interface having access to the ACH system 150. The present disclosure contemplates other payment types, including ACH, Certified Funds, Wire Transfers, credit cards, certified checks, cash and any other form of payment allowed by the taxing authority. The TDA system 100 can also print receipts and track all aspects of the payment process.

In the various embodiments, one or more interfaces may be used to interact with the controller element 102 of the TDA system 100. Each of the interfaces preferably provides access to one or more desired or necessary parties of a TDA transaction. In the illustrated embodiment, an investor interface 160, a tax collector interface 170, and a title company interface 180 are provided. Any one of which can be a user interface for the TDA system 100. In these embodiments, each interface can consist of an application or module that may be used to process a TDA, or to enter other information associated with a TDA. Such a module may be implemented using a stand-alone program or through a client interface having access to the TDA system 100. It can be appreciated that such an application may be configured to operate on personal digital assistants, laptop computers, desktop computers, smart phones, or essentially any computing device capable of sending, receiving, and displaying data. Furthermore, it can be appreciated that access to the TDA system 100 can be provided locally or through a network connection. It can also be appreciated that such an application could be accessed at any time, allowing TDA information in the mass storage system 101 of the TDA system 100 to be modified at any time by a user of the investor interface 160, the tax collector interface 170 and/or the title company interface 180. It can also be appreciated that in some embodiments, interfaces may be provided for other users, such as buyers, owners, or any other interested party. The communication between one or more of the user interfaces and the TDA system 100 may be simultaneous. The present disclosure also contemplates a hierarchy of user interface communication where particular data may be protected based upon its source, such as, for example, tax information communicated to an investor from the tax collector. In one embodiment the TDA system 100 has modules for interaction and communication with newspapers, clerks of the court, and sheriffs offices.

Figure 2:
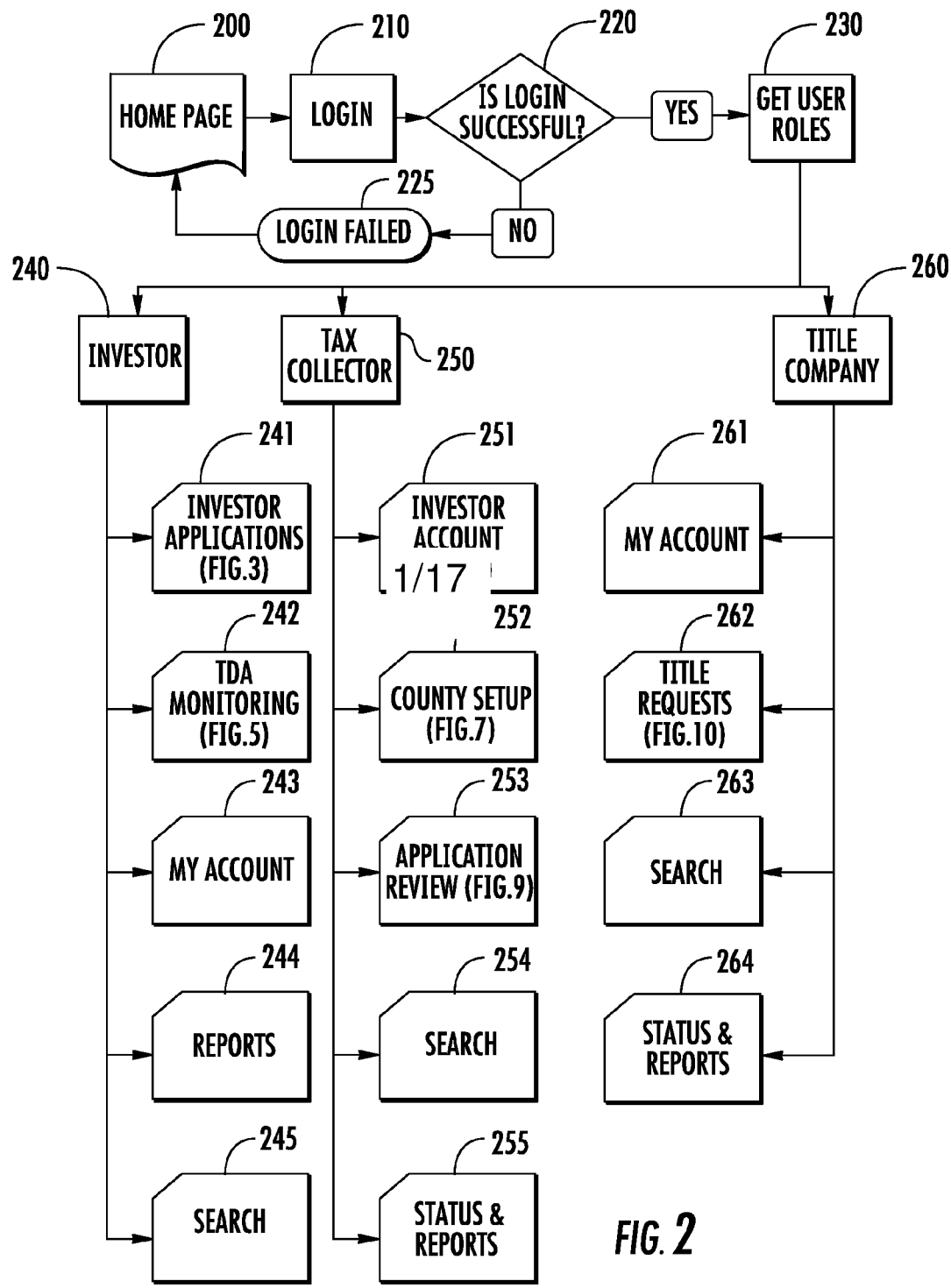
FIG. 2 is an exemplary schematic for a process flow to determine available user functions in accordance with an embodiment of the present invention.

In operation, the controller element 102 can limit the type of data entry and processing allowed by a user depending on the type of user. In the exemplary process flow show in FIG. 2, it is contemplated that an interface to the TDA system 100 can comprise a single point of access through a common interface, step 200. For example, access to the TDA system 100 might be provided through a secured website, in another embodiment, a common client application could also be used to provide access to all types of users, such as title companies, administrative users, sheriffs offices, clerks of the court, newspapers and any other person requiring access to the application or process. However, it is also contemplated that different types of users would have different types of access points to the TOA system 100. For example, in some embodiments, a specialized client or a different web page could be provided to specific types of users. Such methods of access are provided by way of example, not limitation, and other systems providing access to the TDA system 100 are contemplated by the present disclosure.

In step 210, the user can login to the TDA system 100, and the TDA system 100 would verify if the user is authorized, step 220. if the user is not authorized, step 225, the user would then be prompted to login again. If the user is authorized, then the TDA system 100 would retrieve information identifying the type of user, step 230, and retrieve the appropriate entries or interfaces available to the user, steps 240, 250 and 260. In the exemplary process flow, an interface is provided for investors, step 240, and in steps 241-245, one or more tasks or interfaces allowed for investors is identified. Similarly, an interface is provided for fax collectors, step 250, which identifies one or more tasks or interfaces allowed for tax collectors, steps 251-255. An interface is provided for title companies, step 260, which identifies one or more tasks or interfaces allowed for title companies, 261-264. The interfaces and tasks discussed herein for the various users are present by way of example, not limitation, and it is contemplated by the present disclosure that additional tasks or interfaces could be added based on the particular needs of a user or group of users, in the various embodiments, once the user is provided the appropriate interface, the user may proceed to use the TDA system 100 accordingly.

The present disclosure contemplates other types of access including clerk of the court since the tax deed application often moves to the clerk of the court for the legal disposition of the property and is often auctioned at the courthouse steps. Other types of access can include the sheriffs office which needs to serve notice to all owners of the property, and newspapers, such as where statues require advertisement of the properties that are scheduled for sale. Often this requires retyping of owner names, legal descriptions and other pertinent information related to the sale of the property. In one embodiment of the invention, newspaper advertisements can be generated, reducing the amount of double entry required, and the data transmitted to the newspaper of record. In one embodiment a module is provided for access by administrative users and/or auditors with relevant statistics, checks and balances for auditors and administration.

Figure 3:
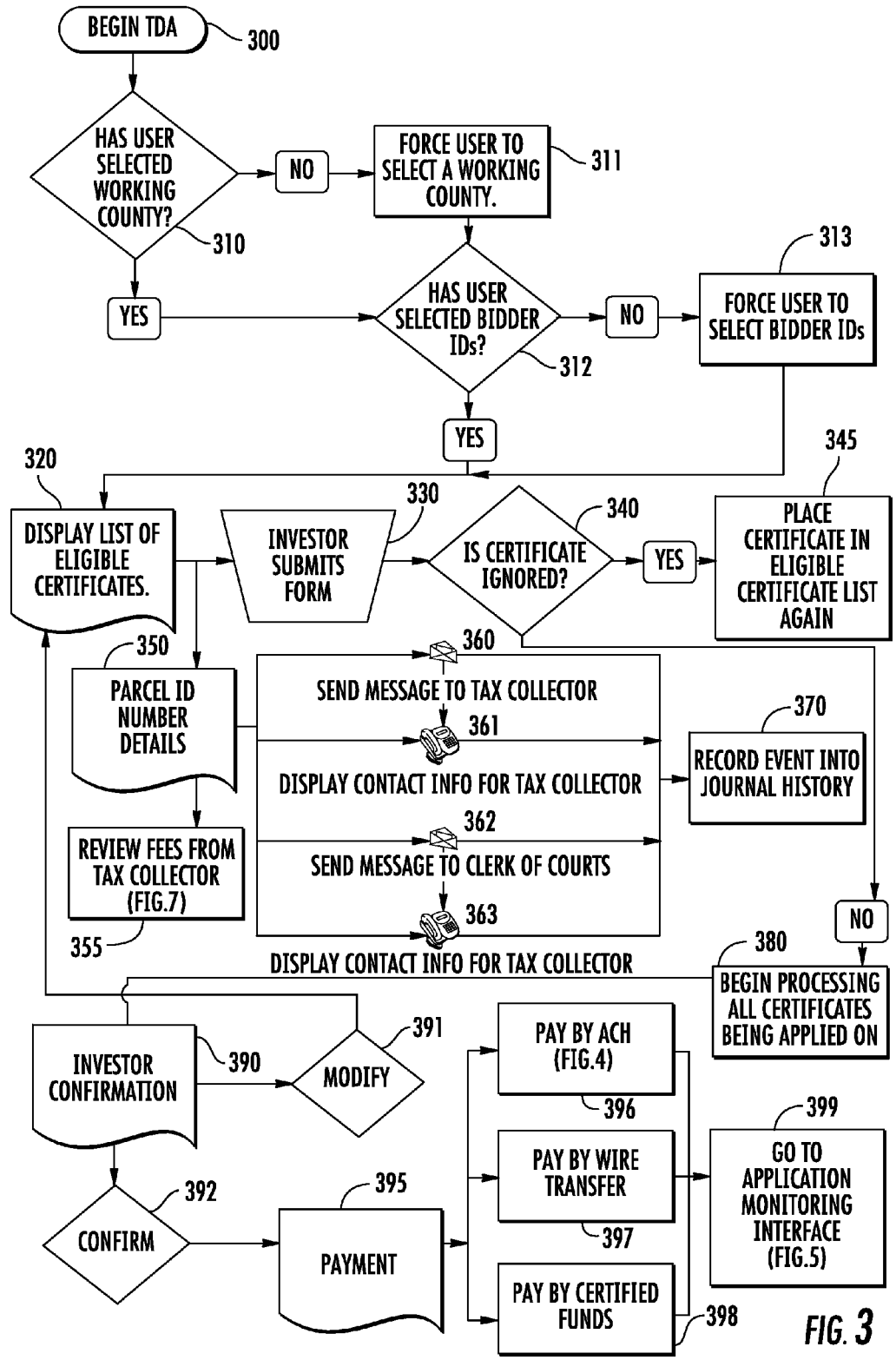
FIG. 3 is an exemplary process flow for an investor tax deed application module in accordance with an embodiment of the present invention.

FIG. 3 depicts an exemplary process flow for an investor to create a TDA. First, after the investor interface is provided in step 300, the investor can be prompted to select the proper locality for the TDA, steps 310, 311, by choosing the county of the parcel, so that the TDA is forwarded to the proper tax collector office. Next, the investor can be prompted to select one or more bidder IDs for the fax certificate in question, steps 312, 311.

At the original tax lien auction, each investor wishing to place a bid typically is required to supply a deposit, tax ID number and a fill out a W9 form. Each investor is then issued a bidder number or buyer number or vendor number. When the investor obtains a certificate, the certificate is assigned to their corresponding bidder number. The present disclosure contemplates that the first time an investor accesses a county within the TDA application, the system 100 displays a list of all bidder numbers/certificate holders in that county. The investor can then select the bidder numbers) that belong to them. The system 100 will recognize the users certificates each time they tog in. The present disclosure also contemplates the investor entering their tax ID number for quicker access to the relevant certificates.

Afterwards, the investor is ready to start constructing the TDA. First, the TDA system provides a list of eligible certificates for which the investor can currently file a TDA, step 320. In some embodiments, the TDA system 100 may be configured to automatically retrieve tax certificate data from a remote database, such as a tax collector database 140 or a property appraiser database 130, in other embodiments, the investor interface may provide functionality for an investor to manually enter information on tax certificates in his possession.

After making a selection of certificates, the investor can choose to immediately file the TDA's with the tax collector office by submitting them to the TDA system 100. In one embodiment, once a list of eligible certificates is displayed, the investor can choose to ignore certain items he does not wish to make an application on. Generally, this occurs when the investor recognizes certain qualities of a certificate (dollar amount, location, property type) which might make it an unwise investment. These items can be placed in a storage area of the application, such as an "ignore bin," In another embodiment, if the TDA is ignored by the tax collector, step 340, the certificate can be placed back into the list of eligible certificates in order to file a TDA at a later time. However, if the tax collector selects the TDA, then the TDA is processed. It can be appreciated that during any of these steps, the current progress of a TDA can be provided by a status identifier in the interface of the investor.

It can also be appreciated that in some cases, the investor will wish to review the TDA's with greater scrutiny. In the various embodiments, the investor can be provided with a link to the tax collector database 130 or the property appraiser database 140, in order to carefully examine the information regarding the parcel. Such an embodiment can be advantageous in that it allows the investor to verify if indeed tax debt is still due on the property prior to filing a TDA. Additionally, contact information may be provided to an investor, steps 360-383, for the investor to contact the fax collector, as shown in the illustrated embodiment, or some other authority having knowledge of liens and encumbrances on a property. In some embodiments, a record of the contact can be recorded to allow an investor to review his actions later, step 370. The present disclosure contemplates the use of other links to facilitate the process, including links to information for GIS, mapping, environmental, and/or flood zones.

In general, the TDA process requires the tax collector to provide proper calculation of fees and interest for the tax certificate. In the various embodiments, the investor may allow the TDA system 100 to automatically calculate these values prior to transmittal of the TDA. However, in some embodiments, the investor may wish to review fees and interest and also may desire to verify that they are up to date, step 370. In such embodiments, the investor interface can provide a link to the tax collector database 130 or other system to retrieve the current schedule of TDA fees and interest for an investor to review or to verify that proper calculations have been made. Afterwards, the investor can choose to submit the TDA, step 330.

As shown in the illustrated embodiment, the TDA system 100 can be further configured to verify that the investor has entered correct identifying information, step 390. In the various embodiments, such verification may take place by reviewing any information uploaded to the TDA system 100 or by accessing a remote system having the verification information. If the investor information is incorrect or has been modified, step 391, the TDA system 100 can require the investor to review the TDA information. If the information is correct, step 392, then the investor can proceed with making payment of the required fees, step 395. It can be appreciated that in some embodiments, fees will not be required until a tax collector reviews and updates a TDA with any additional information, such as information associated with other tax certificates. However, it is also contemplated that an investor could make immediate payment and make deficiency payments at a later time. In the various embodiments, one or more methods of electronic payments can be used, steps 396, 397, or a user could take certified funds directly to a tax collector office, step 398. Once payment is made, the initial investor involvement in the TDA is complete. However, the investor can continue to monitor the progress of the TDA through an investor interface or TDA status interface, step 399.

Figure 4:
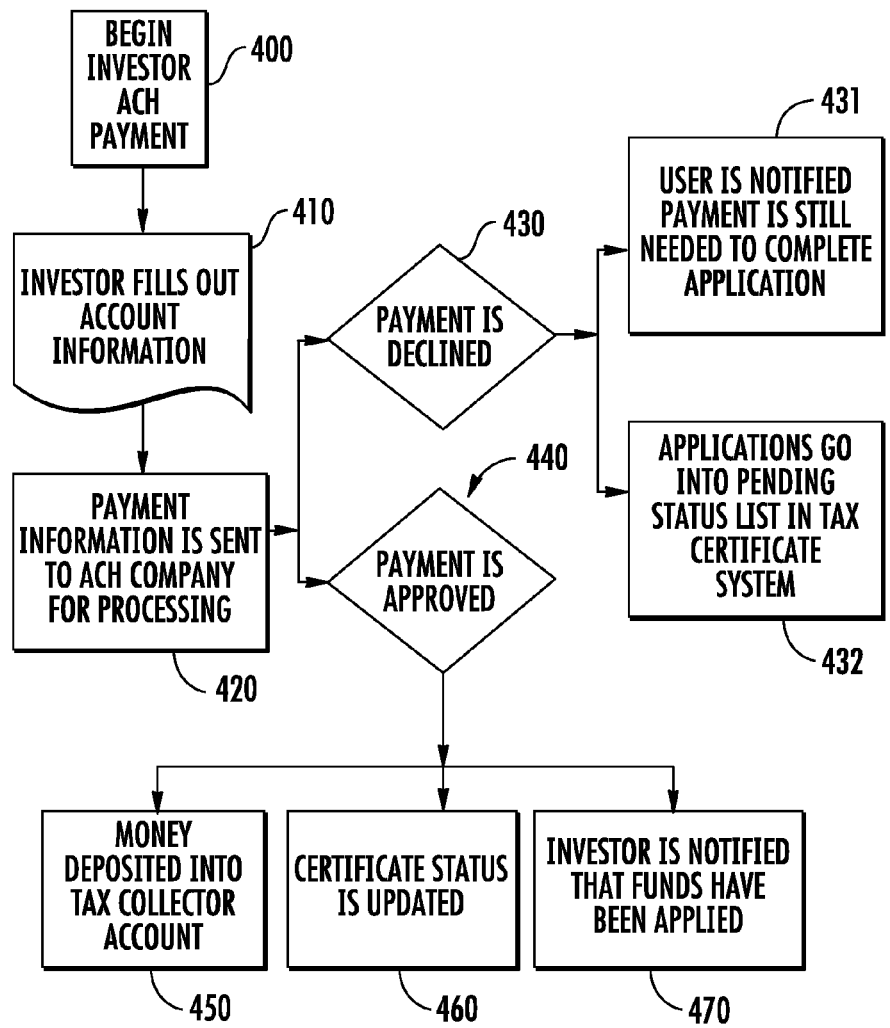
FIG. 4 is an exemplary process flow for an automated clearing house payment module in accordance with an embodiment of the present invention.

As previously discussed, the electronic payments may be made through a third party application. However, as shown in FIG. 4, an electronic payment processing can be integrated into the TDA system 100. In the illustrated embodiment, an interface is initiated to allow payment by ACH, step 400. First, the investor provides account information for the source of the funds, step 410, and the information is sent to the ACH company for processing, step 420. It can be appreciated that in some embodiments, the investor may manually provide TDA information to identify an origination for the funds so that they can be transferred to the tax collectors account, in other embodiments, the ACH interface may be directly linked with a TDA, allowing TDA information to be populated automatically by the TDA system 100. The present disclosure contemplates other payment options including direct payments into the tax collectors account via a direct electronic gateway.

After payment is submitted, the ACH company may either reject the payment, step 430, or approve the payment, step 440. If the payment is rejected, a notice can be sent to the investor that further action is necessary. Such notice can be provided via the status identifier in the investor interface, but can also include other typos of messaging, such as voice or text message to a wired or wireless communications device or a computer system, in addition, a TDA deficient in payment may further be classified as a pending application, waiting for the investor to act at a later time, step 432. The present disclosure contemplates applications "expiring" if the funds are not received in a certain amount of time. The time period can be set by the county in their setup options.

If the payment is approved, step 440, the ACH system can then transfer the funds to a tax collector account and the TDA system 100 can be configured to update the status of the TDA, step 460, and provide notice, as previously discussed, that funds for a TDA have been transferred to a tax collector, step 470. It is further contemplated in the present disclosure that in some embodiments, the ACH system may be configured to verify the status of a parcel at any point in the payment process. Such an embodiment is advantageous as any transaction may be baited as soon as a parcel associated with a TDA is no longer encumbered by the tax certificate. In other embodiments. His TDA system may be configured to automatically notify the ACH company or system to halt processing in response to a withdrawn TDA or in response to a parcel associated with the payment being no longer encumbered by the tax debt, in one embodiment, system 100 can track funds during the various stages of the application process and/or refunds may be issued through the system.

Figure 5:
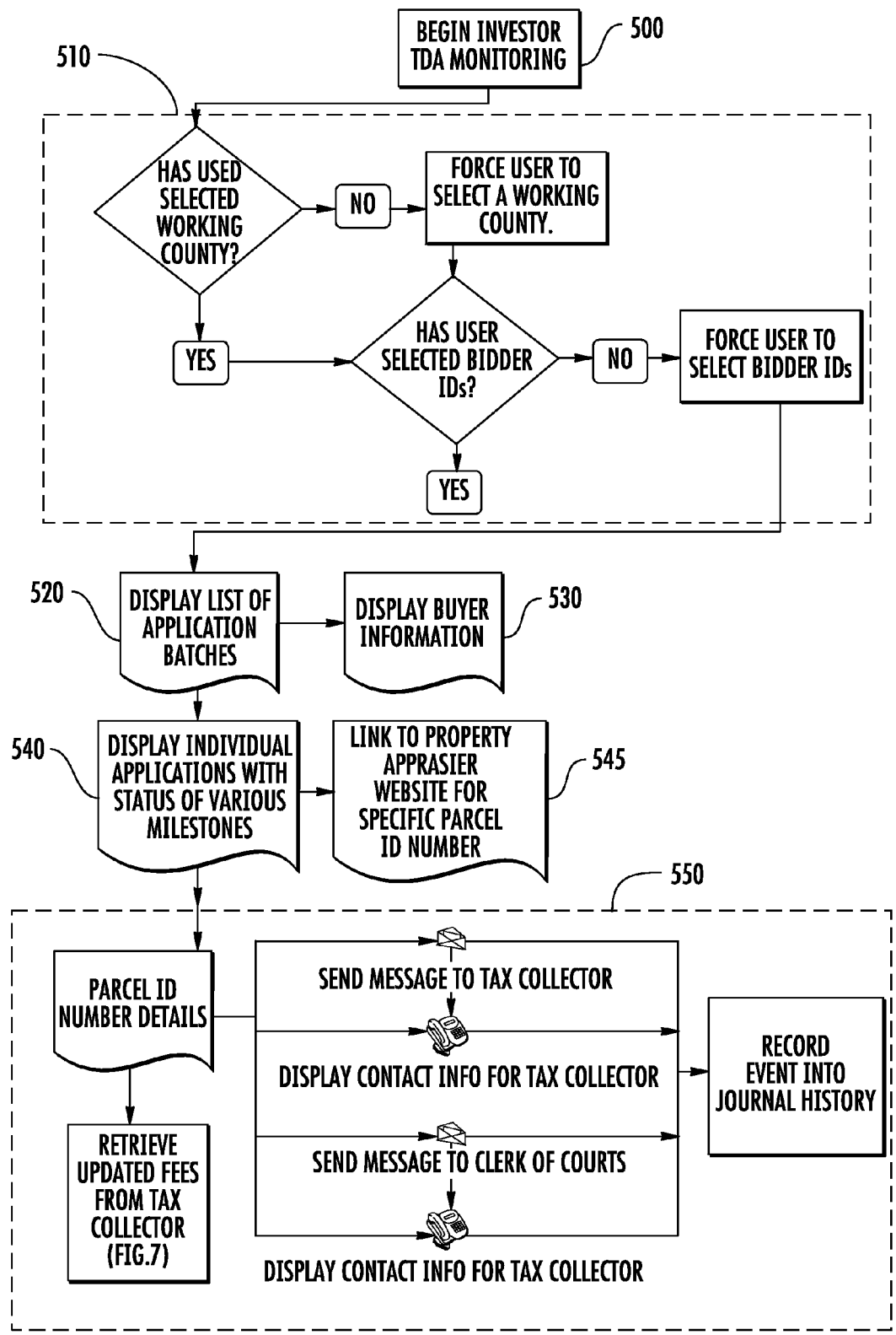
FIG. 5 is an exemplary process flow for a tax deed application monitoring module in accordance with an embodiment of the present invention.

As illustrated in FIG. 5, the investor can be provided with an interface to monitor TDA's, step 500. As previously discussed, since TDA's and their processing can be dependent on a particular locality, an investor interface providing status information can be configured to first require the investor to select a locality and bidder ID's to review, step 510. The investor interface can then be configured to provide the investor with a list of the TDA's eligible for submission, step 520. It can be appreciated that in some embodiments, the TDA's may be submitted as part of a batch, and that the information for some or all of the TDA's in a batch may be displayed concurrently. For TDA's already approved and sold or certificates already redeemed or withdrawn, the investor interface can also provide the list of buyers and associated information, step 530. Such an embodiment is advantageous because tax debt can be repaid up until the moment that the tax deed is executed, in which case a buyer would be informed that his claim to the parcel is no longer valid. Along with batch information, individual TDA information, including milestones and any critical dates can also be provided, step 540. In some embodiments, the parcel information can be provided automatically while reviewing a TDA. In other embodiments, a link or connection to a property appraisers database may also be provided, step 545, to permit review of parcel information. It is also contemplated in the present disclosure that the individual TDA information can also include payment information, title search information, fax collector review status, and updated fee and interest information. Additionally, parcel information, as previously described, along with locality contacts, stop 550, can also be provided.

Figure 6:
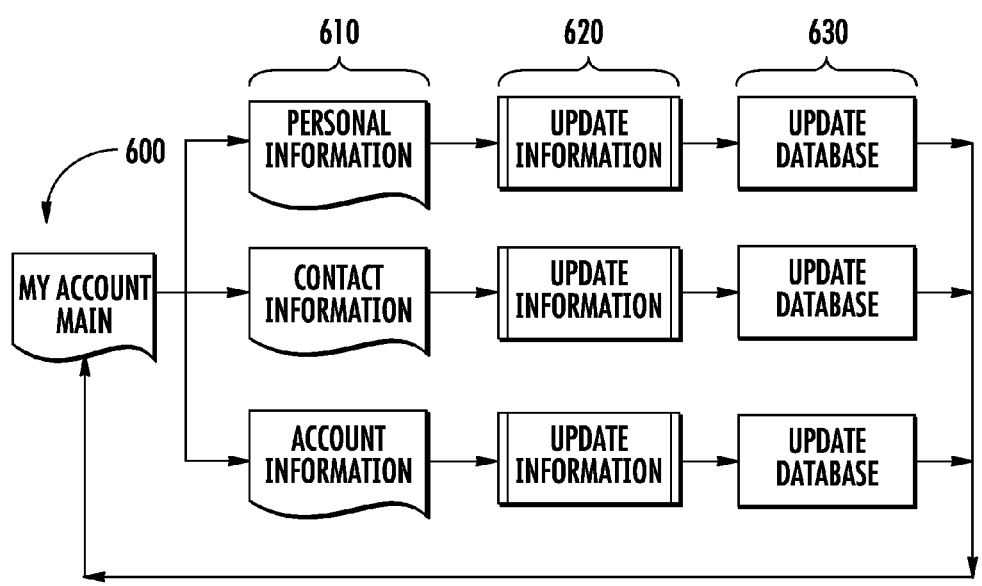
FIG. 6 is an exemplary process flow for an investor information entry module in accordance with an embodiment of the present invention.

In the various embodiments, an investor can also be provided with an interface to input or retrieve contact information and other identity or legal information, in the illustrated embodiment in FIG. 6, a process flow, applicable to investors, tax collector, title companies, or any other necessary parties to the TDA, is shown. Upon access of the information module 600, the user may enter or update the necessary information, slaps 600, 610, and the TDA can automatically update the information in the TDA system. This is advantageous in that whenever a record is accessed by one or more of the parties using the TDA system, the most up to date information can be shown, regardless of when the information was entered, it can also be appreciated that in some embodiments, a user actively working on a file may be provided notice of any changes, including contact or identity information.

In some embodiments, changes in information may be indicated by highlighting the updated information with some indicia, coloring, or shading in a user interface. The present disclosure contemplates the use of a journal history where each action taken or designated actions taken on a certificate in the application process is noted in a journal history log. A user may log in to see the date, action and relevant notes for any certificate. The journal history log can include date of application, date of money transfer, date of title request, title progress, money received, any messages and certificate progress.

Figure 7:
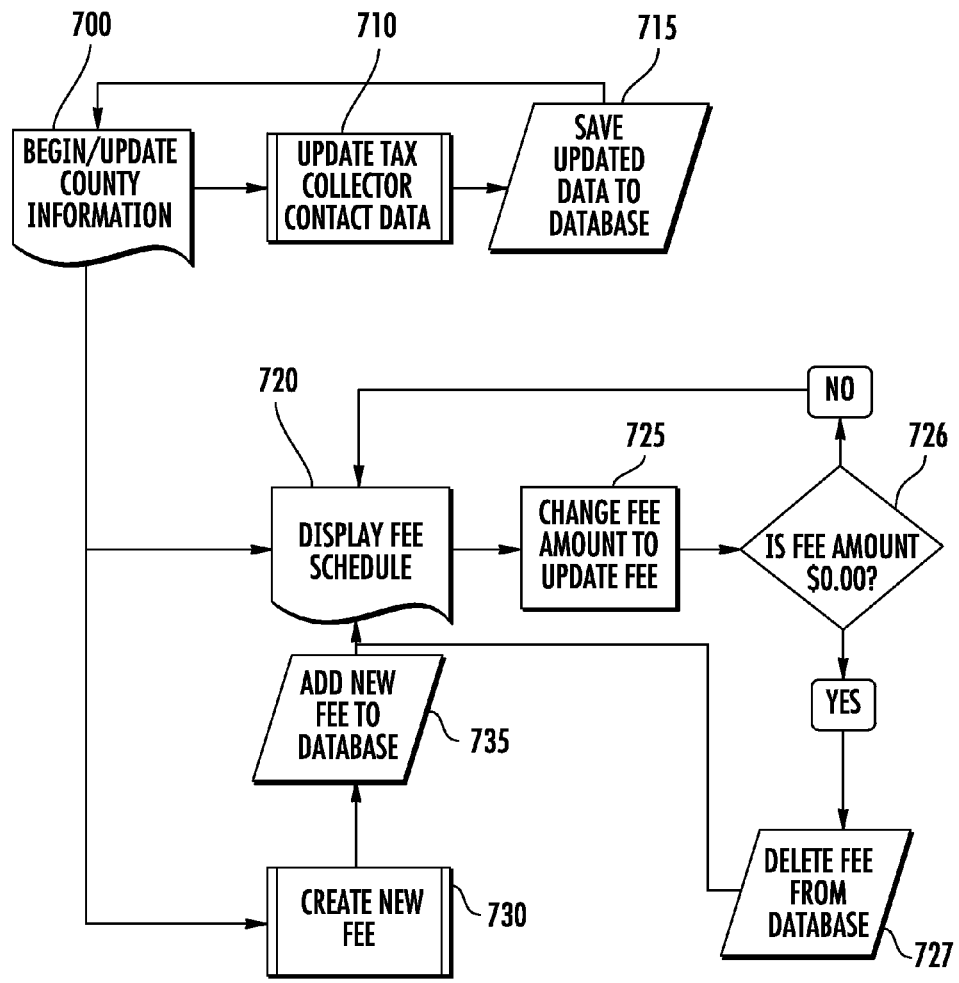
FIG. 7 is an exemplary process flow for a title request module in accordance with an embodiment of the present invention.

As previously described, when a user is identified as a tax collector, a different set of tasks, options, or interfaces may be provided, in the various embodiments, the tax collector can be provided with an interface to enter county information including, but not limited to, fee and interest information and tax collector contact data. In the exemplary flow shown in FIG. 7, the tax collector can provide updated tax collector contact data, which can be entered by the tax collector and updated by the TDA system automatically, steps 710, 715. However, the fax collector can also review and update a fee or interest schedule. For example, the tax collector interface may initially display the fee schedule to the tax collector, step 720. The tax collector may then choose at least one entry to modify, step 725. In some embodiments, the tax collector interface can also be configured to select a fee and allow immediate deletion. In other embodiments, the fee can be set to zero, step 726, and the TDA system 100 interprets this as an act to delete the fee. Afterwards, the new fee schedule may be displayed. Alternatively, the tax collector can add one or more fees. A new fee could be defined, step 730, and afterwards the fee schedule is updated, step 735. Afterwards, the appended fee schedule is displayed, step 720. It can also be appreciated that in some embodiments, a user actively working on a file may be provided notice of any changes, including contact or identity information, in some embodiments, changes in information may be indicated by highlighting the updated information with some indicia, coloring, or shading in a user interface.

Along with specific county information, the tax collector interface can include an interface to review one or more TDA's. Using an interface executed using the exemplary process flow in FIG. 8, the tax collector can review the TDA's or print out the required documents. First, the active applications are displayed to the fax collector, step 800. The tax collector can then carefully review the contents. In some embodiments, the tax collector can choose to review one TDA at a time, or a set of TDA's submitted as a batch, step 810. The interface can also be configured to allow the tax collector to review property appraiser information for a parcel in a TDA, step 820. Additionally, the interface can also be configured to allow the tax collector to review other details of the parcel, step 830, including information at the tax collector's office. It is also contemplated by the present disclosure that the reviewer at the tax collector's office may wish to contact other personnel regarding specific details of the parcel and the TDA. Therefore, in some embodiments, the TDA system 100 may provide contact information for specific tax collector personnel, step 841, 842, court personnel, steps 843, 844, or other any other relevant government agencies, it is contemplated that a link to contact such personnel can also be included in the tax collector interface. Additionally, records of such contacts may be recorded as part of the TDA status for later review by one or more users. In the various embodiments, it is also contemplated that the tax collector may wish to update or review fees and interest for accuracy, and may be provided with access to fee or interest schedules, step 860, to verify their accuracy.

Figure 8:
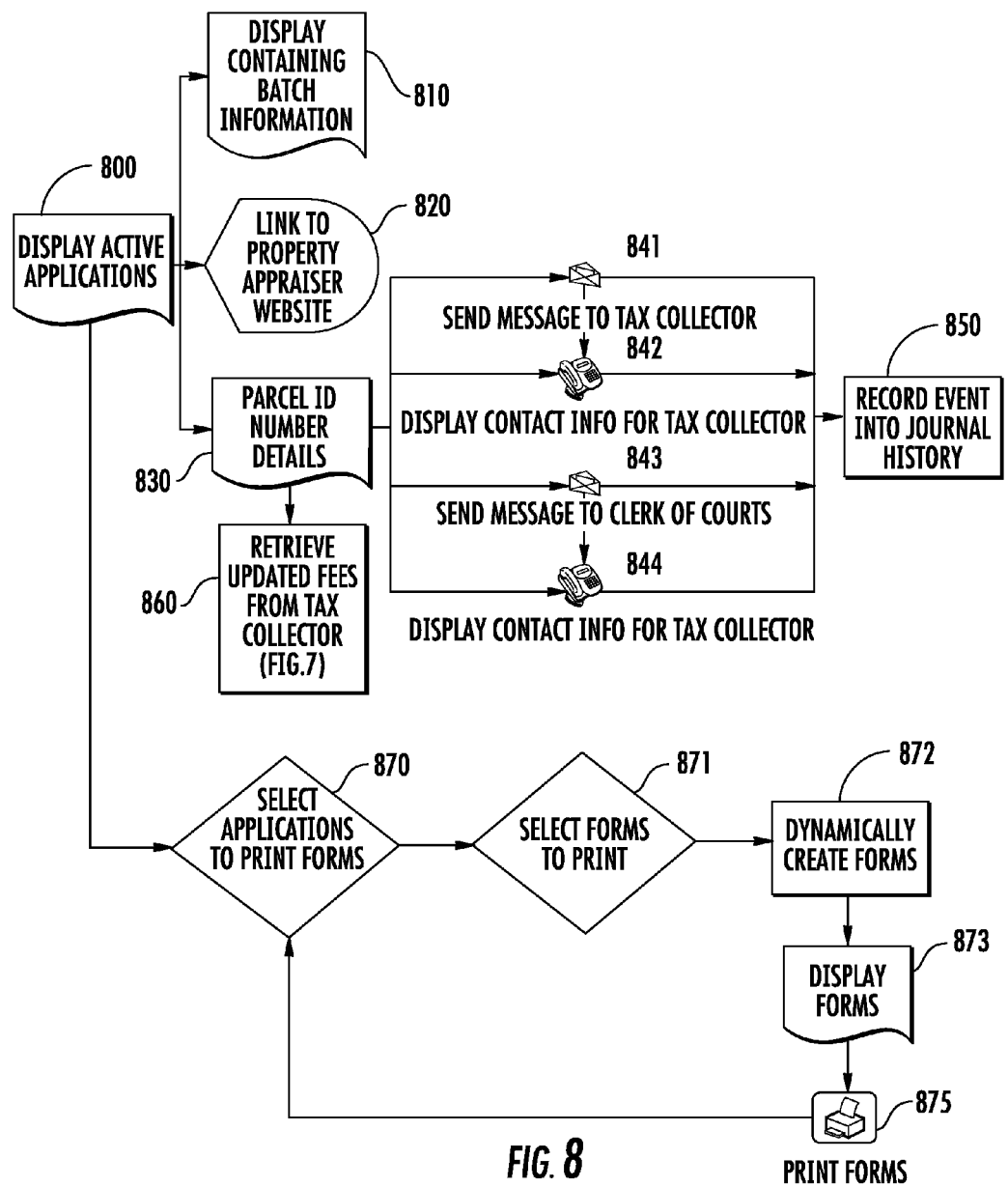
FIG. 8 is an exemplary process flow for fee retrieval module in accordance with an embodiment of the present invention.

Alternatively, in some embodiments, as shown in FIG. 8, the tax collector interface can be further configured to allow the tax collector to print one or mom documents associated with a TDA, step 870. Using the TDA system 100, the tax collector can choose TDA forms to print, step 871, and can have the TDA system 100 populate them automatically, step 872, as well as review or print the forms, step 873, 875. The present disclosure also contemplates allowing the forms to be edited, as well as allowing the user to add, modify or delete new forms as necessary.

Figure 9:
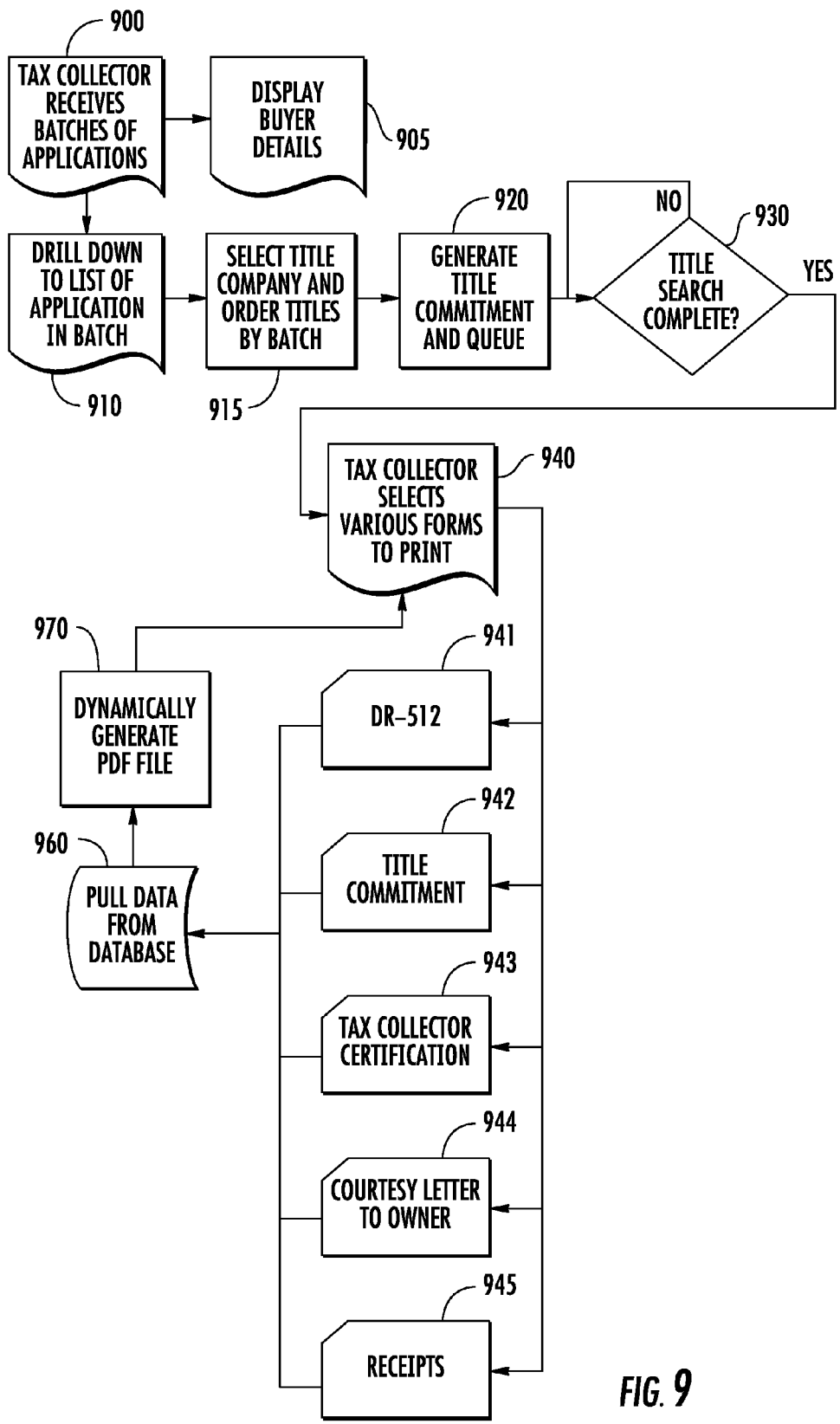
FIG. 9 is an exemplary process flow for a fax deed application review module in accordance with an embodiment of the present invention.

In the various embodiments, the tax collector interface can also allow the tax collector to request a title search and subsequently print forms and letters once the title commitment or search results are received from the title company. An exemplary process flow for such an interface is shown in FIG. 9. First, the tax collector can retrieve TDA's separately or in a hatch, as previously discussed, steps 900, 910. The interface can also provide for the tax collector to view buyer information, step 905, to verify it is complete and proper for the tax deed sale. Once one or more TDA's are selected for a title search, the interface can be configured to allow the tax collector to order the title search from a title company, step 915. It can be appreciated that in some embodiments, a TDA could be sent to a title company as part of a batch of TDA's. Additionally, a tax collector could designate specific title companies for specific TDA's or batches of TDA's. Once the request is submitted to the TDA system 100, the request goes into a queue, step 920 for a title company. It can be appreciated that the tax collector interface can include a status identifier indicating when title search results have returned, in other embodiments, the TDA system 100 could be configured to send a notice directly to the fax collector, such as in the form of a voice, text, or an electronic message, indicating to the tax collector that the title search is complete. The present disclosure also contemplates a tax collector setup utility that allows for logos, seals, images and electronic signatures to be appended to all documents.

Once the title search results return and a title commitment is made, the tax collector interface can be configured to allow the tax collector to print out one or more forms and letters, step 940. In the illustrated embodiment, the forms can include, but are not limited to, standard government forms, title commitment forms, a fax collector certification, a courtesy letter to the owner, and payment receipts, steps 941-945. The investor interface can also be configured to automatically populate the forms using information stored in the mass storage system 101 or elsewhere, step 960. Finally the forms could be printed out by the tax collector placed into an electronic format to transmit to another party, step 970. In the illustrated embodiment, a PDF format is used, however it is contemplated that any electronic format for documents could also be used as wall.

As previously described, when a user is identified as a title company, a different set of options and/or interfaces may be provided. For example, an interface operating in accordance with the exemplary process flow in FIG. 10 could be provided. The interface can be configured to show new title requests and provide access to each one, step 1000. In some embodiments, the interface can also be configured to allow a title company to print a title request form for the application, step 1010.

Figure 10:
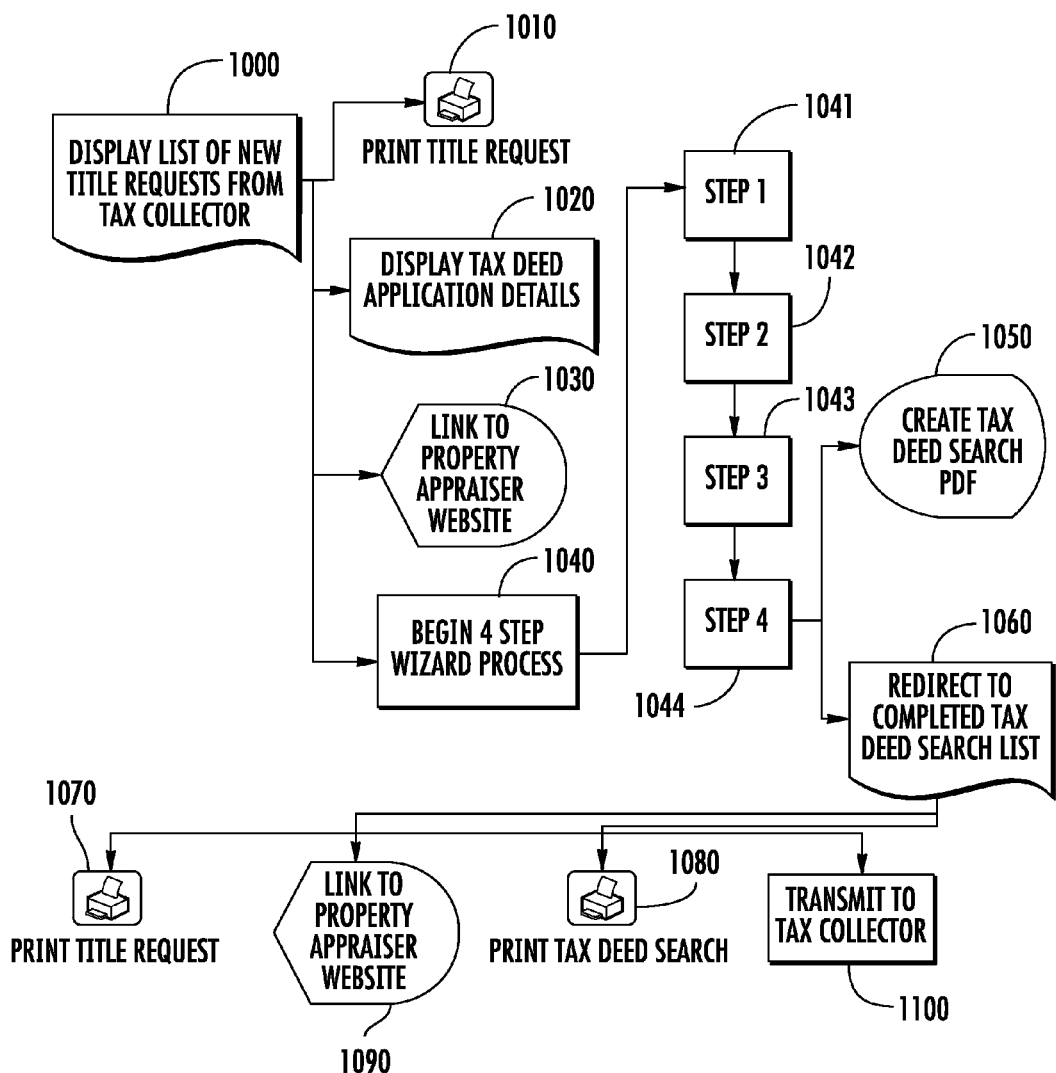
FIG. 10 is exemplary process flow for a title company interface module in accordance with an embodiment of the present invention.
Figure 11:
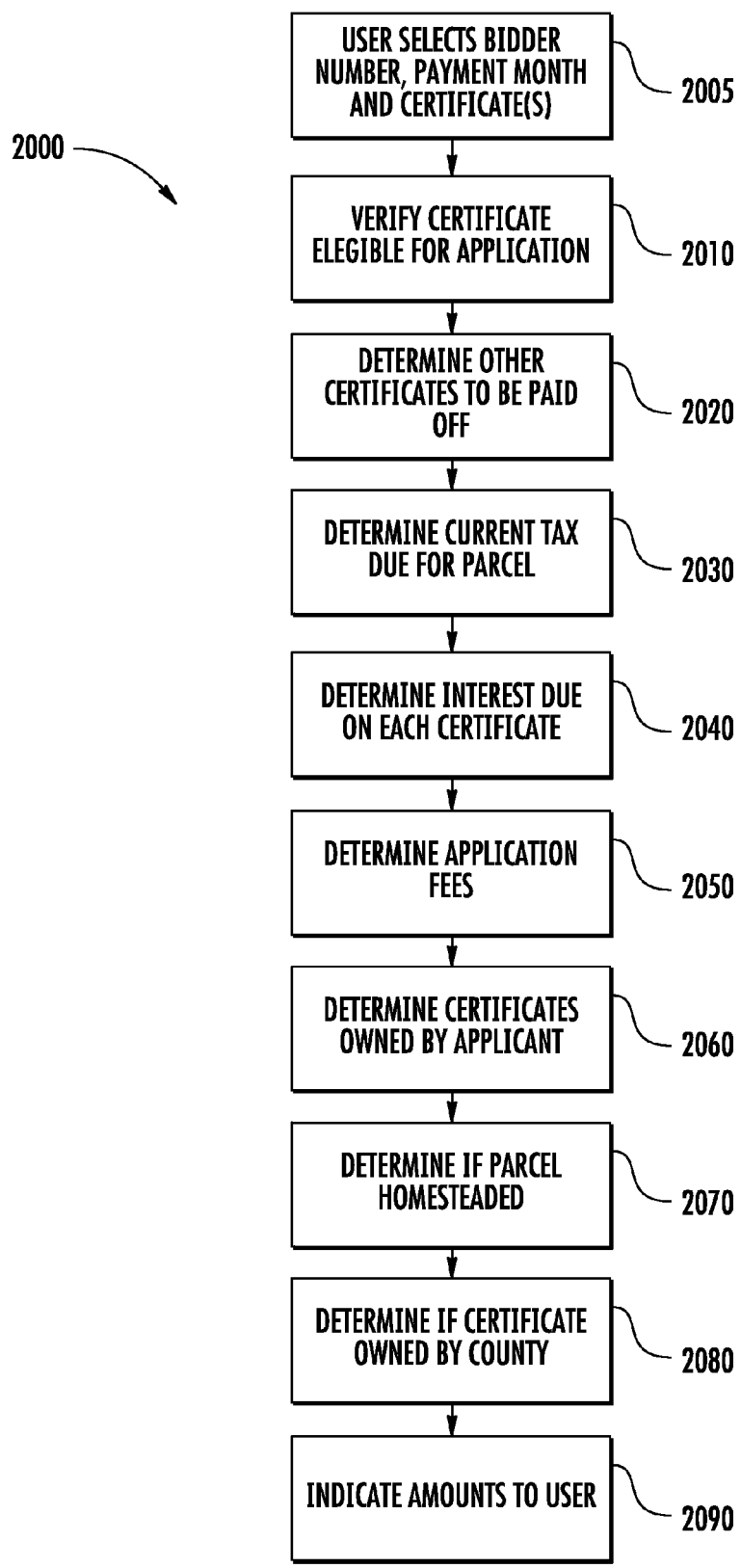
FIG. 11 is an exemplary process flow a quote utility that generates estimated application costs and interest calculations for one or more applications.
Figure 12:
FIG. 12 is a bidder number page for the quote utility of FIG. 11.
Figure 15:
FIG. 15 is a summary page for the quote utility of FIG. 11.
Figure 16:
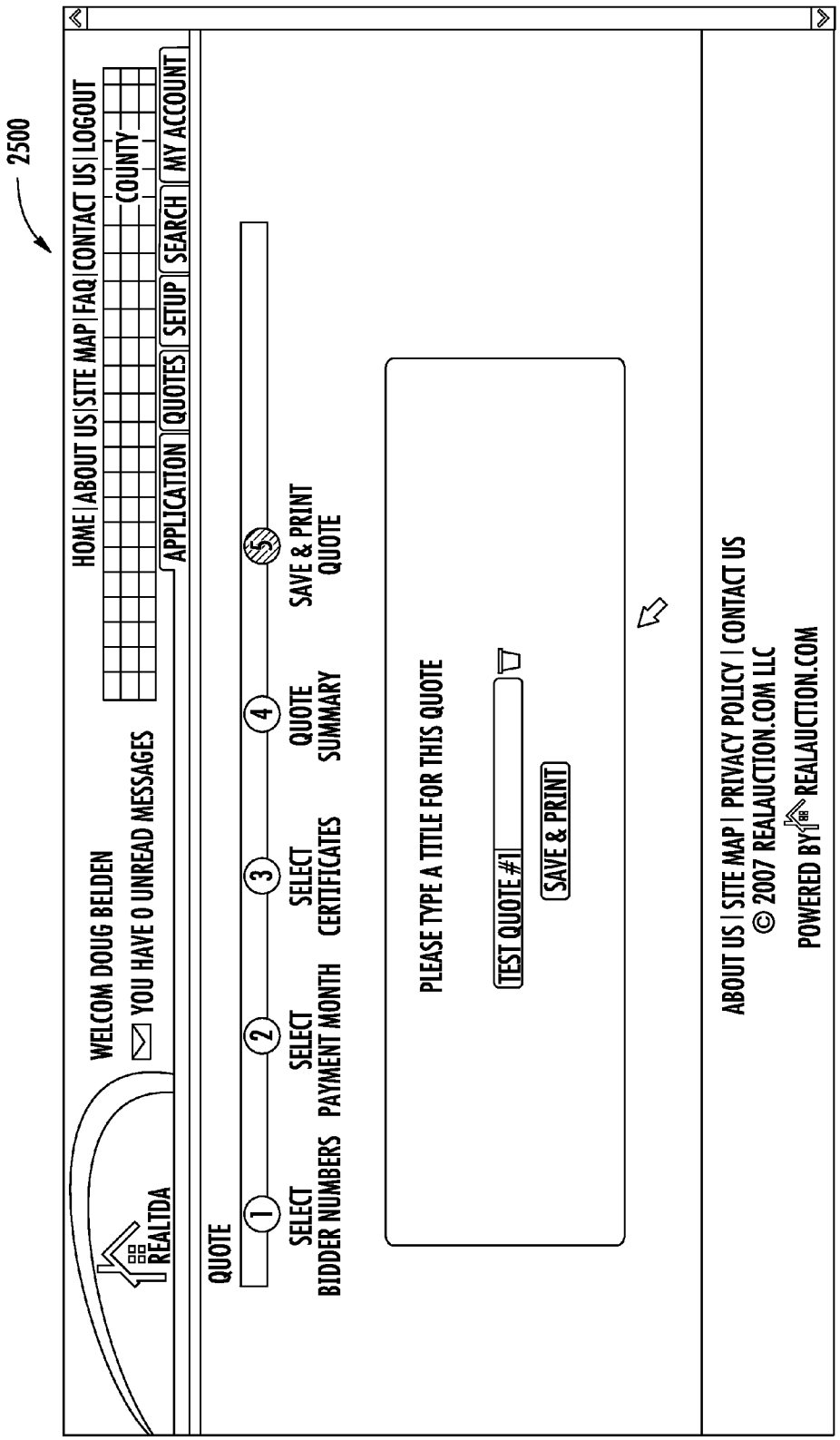
FIG. 16 is a save page for the quote utility of FIG. 11.

In the various embodiments, a title request can include the tax deed number, the applicant name, the parcel ID number, the legal description, certificate number and/or certificate year. As shown in FIG. 10, the title company interface can also allow the title company user to display the details about the tax deed and the journal history, step 1020. In some embodiments, the parcel ID Number can be linked to the property appraisers website in order to provide details about the parcel to the title company, step 1030.

As illustrated in FIG. 10, the title company interface can also be configured to allow the title company to start and complete the tax deed search or ownership and encumbrance report, step 1040. In the illustrated embodiment, a wizard is provided for completing toe steps for the tax deed search, steps 1041-1044.

In Step 1041, the wizard interface can be configured to prompt the user to provide information, including, but not limited to: records searched to date, parcel ID number, property description, pertinent probates, guardianships, personal judgments, liens of record, and a list of apparent title holders and addresses. In Step 1042, the wizard interface can be configured to prompt toe user to add a list of names and addresses of mortgagees and/or a list of names and addresses of lien holders. In step 1043, the wizard interface can be configured to prompt the user to add a list of names and addresses of the persons to whom faxes were assessed for the year the tax sale certificate was issued, pursuant to the application for the tax deed and/or a list of names and addresses of persons appearing on the current tax roll. In Step 1044, the wizard can be configured to prompt the user to provide the gross assessment, exemption status and type, amount of tax assessment. The wizard can also prompt the user to indicate whether the assessment has been paid, the date paid and the amount, as well as whether there are any special assessments on the parcel, their types and amounts, if they've been paid and the date they were paid. Once the wizard is completed, the title company interface can be configured to display an electronic version of an automatically populated tax deed search form, step 1050. In the illustrated embodiment, a PDF format is used, however it is contemplated that any electronic format for documents could also be used as well. Additionally, the title company interface can be configured to display a list of completed title searches that are ready to transmit to the fax collector, step 1060.

In the various embodiments, the title company interface can allow a title company to select one of the completed title searches and print a copy of the title request sent by the county that requested the tax deed search, step 1070, or to print the completed tax deed search form, step 1080. The interface can also be configured so that a TDA number links back to the basic details about the property including the parcel ID number end the journal history, the application number, the applicant name, or a request date of the tax deed search, in some embodiments the parcel ID can be linked to a property appraiser's database to review other parcel details, step 1090. The title company interface can also be configured to allow a title company to transmit the fax deed search results to the fax collector, it is contemplated that each time the results are submitted to the county, a date/time stamp for when if was sent can be displayed and stored along with other TDA information in the mass storage system 101.

In one embodiment, a message utility or module is incorporated into, or operable with, system 100. Investors, tax collectors, clerks or another user type can click a button and send messages to other users of the system. The specific parcel information can be referenced in the subject line and alert notifications may be set. In one embodiment, once the intended recipient logs info the program, the user can be alerted that new messages are waiting.

In one embodiment, a legal comparison utility or module is incorporated into, or operable with, system 100. When an application is received, the contemporary process required counties to manually inspect the legal description for the past several years to look for changes and discrepancies to the property. Such inspection was critical for "splits" where one property had been divided into multiple sections. System 100 performs the inspection and can notify the tax collector of possible errors. System 100 also can allow the tax collector to suspend, allow or edit the TDA and legal description.

In one embodiment, system 100 can prepare applications on certificates owned by the county. System 100 accounts for differences in fees where the county is exempt from many fees normally paid by the investor. System 100 can also prepare a report to send to the county commissioners for the county held certificates eligible for application.

In one embodiment, a newspaper advertisement or notification utility or module is incorporated into, or operable with, system 100. The newspaper advertisement utility can generate the official newspaper advertisement to send directly to the newspaper of record prior to the auction. The newspaper utility eliminates the need for re-typing the information by the clerk of court or newspaper staff.

In one embodiment, a certified mailing feature is incorporated into, or operable with, system 100. The certified mailing feature eliminates the need for the tax collector, clerk or sheriffs office to create separate mailing labels for all owners of record.

In one embodiment, a reports and statistics utility or module is incorporated into, or operable with, system 100. The reports and statistics utility or module can break down the number of applications, amounts and status. The reports and statistics utility or module can also generate other reports based upon criteria established by one or more of the users.

In one embodiment, a suspension bin is provided for system 100. The suspension din allows access, for viewing and/or disposition, to applications or certificates that the county has suspended.

In one embodiment, a litigation bin is provided for system 100. The litigation bin allows access, for viewing and/or disposition, to applications or certificates that are or were in litigation.

In one embodiment, a search utility or module is incorporated into, or operable with, system 100. A number of criteria can be used to locate a particular certificate in the application process through use of the search utility or module. These criteria include, but are not limited to, certificate number, parcel ID, legal description. Owner names, properly address, and/or applicant number.

In one embodiment, a courtesy owner notification utility or module is incorporated into, or operable with, system 100. The courtesy owner notification utility or module provides for a "final warning" to a delinquent property owner. The courtesy owner notification utility or module can generate a letter or other communication to delinquent property owners for notification that their parcel is eligible for tax deed application. The courtesy owner notification utility or module can be utilized in those counties where such a procedure is carried out prior to issuing certificates. System 100 allows the tax collector can generate custom letters to delinquent owners as of any specified date.

In one embodiment, en export utility or module is incorporated into, or operable with, system 100. The export utility or module allows for exporting data, reports end statistics info various formats, such as ASCII comma delimited, Microsoft Excel, Access, FoxPro, fixed width and tab delimited ASCII, in one embodiment, system 100 provides for the use of electronic signatures Referring to FIGS. 11-17, system 100 can have a quote utility, process or feature generally represented by reference numeral 2000. The quote utility 2000 can interface with one or more user types through various techniques, such as the pages or windows 2100, 2200, 2300, 2400, and 2500. However, the present disclosure contemplates the use of other display or interface techniques. It should further be understood that quote utility 2000 can be incorporated into system 100 or can be a separate process or system. The quote utility 2000 provides for generation of estimated application costs and interest calculations for one or more applications.

Investors often contact the county several times a year to ask for estimated application amounts and interest calculations, which require expenditure of several hours of county staff time for preparation. System 100 provides quote utility 2000 so that when an investor requests payoff amounts, the tax collector can use the quote utility to easily and quickly generate this information. Quote utility 2000 can perform the required calculations up to a predetermined time period into the future, such as, for example, six months. The present disclosure contemplates other user types having access to and/or utilizing the quote utility 2000, including the investor.

If a user desired a quote request for one or more certificates, the quote utility 2000 provides, in step 2005, pages 2100 and 2200 to obtain the certificate information. On page 2100, the user can choose a bidder number from the certificates owned by the investor for which the quote is desired. Other identifying information can also be used for selection of the certificate. On page 2200, the user can select a future payment month for the certificate. For example, page 2200 can allow for selection of future dates out to six months. However, the present disclosure contemplates the quote utility 2000 providing a quote out to any available date.

The quote utility 2000 verifies that one or mom certificates are still eligible for application in step 2010. In one embodiment, utility 2000 provides page 2300, which includes a list of the eligible certificates. A user can then select which of these certificates are to be included in the quote. In step 2020, it is determined whether other certificates need to be paid off in relation to the particular certificate inquiry. In step 2030, the quote utility 2000 determines the current tax due on the particular parcel.

In step 2040, the quote utility 2000 determines the interest due on each of the certificates. Application fees are determined for the particular certificates in step 2050, in step 2080, the quote utility 2000 determines if any of the certificates are already owned by the applicant.

Where a parcel is subject to particular regulations, rules, laws or other criteria, such as a property that is homesteaded, the quote utility 2000 determines any additional or different fees resulting from the applicable regulations, rules, laws or other criteria in step 2070. For example, where a county requires an additional fee of 50% of the assessed value of the property when homesteaded, the quote utility 2000 can determine if the parcel is homesteaded and then determine this additional fee. The quote utility 2000 in step 2070 can also apply other regulations, rules, laws or other criteria to a particular parcel where additional fees are necessary. Where a certificate is owned by the county or other entity that requires additional or different fees, the quote utility 2000 can determine if the certificate is owned by the county or other special entity and then determine this additional fee in step 2080.

In step 2090, the quote utility 2000 indicates the necessary fees to the user. The utility 2000 can provide a summary of the information, such as in pace 2400, so that the user can verify the information requested prior to printing or saving. The user can be the applicant and/or the tax collector. The present disclosure also contemplates the user being other types that would need or desire to see such information. Quote utility 2000 can provide page 2500 so that the user can save the information for reviewing at a later time and/or print a hardcopy of the report. Quote utility 2000 can indicate the amounts through various media including the printed report 2000. The report 2600 can be electronically transmitted to other entities, including the investor, and can be exported in various formats such as ASCII, Microsoft Excel or Microsoft Access.

The present invention may be realized in hardware, software, or a combination of hardware and software. The present invention may be realized in a centralized fashion in one computer system or in a distributed fashion where different elements are spread across several interconnected computer systems. Any lend of computer system or other apparatus adapted for carrying out the methods or processes described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for processing a tax deed application for a tract of real estate, the system comprising:
   a user interface;
   a database configured to store tax deed data comprising: (1) identification of a tract of real estate, (2) certificate information for a tax certificate associated with the tract of real estate, and (3) investor information for an investor associated with the tax certificate associated with the tract of real estate; and
   a processor configured to communicate with the user interface and the database, wherein the processor executes instructions to perform operations comprising:
   receiving application data representative of the tax deed application for the tract of real estate based at least in part on the tax deed data,
   receiving parcel information data associated with the tract of real estate,
   updating at least a portion of the tax deed data stored in the database based at least in part on the parcel information data,
   allowing monitoring of a current status of the tax deed application for the tract of real estate via the user interface,
   determining an amount of fees associated with the tax deed application, wherein the amount of fees is associated with a tax deed on the tract of real estate; and
   accepting electronic payment of the amount of the fees associated with the tax deed application for the tract of real estate.

2. The system of claim 1, wherein the operations further comprise tracking changes to the tax deed data.

3. The system of claim 2, wherein the operations further comprise indicating a status identifier for the changes to the tax deed data, and wherein the operations further comprise updating the status identifier based on at least one of receipt of the tax deed data, transmission of the application data, receipt of the parcel information data, and updating the portion of the tax deed data.

4. The system of claim 1, wherein the operations further comprise receiving title search data representative of a request for a title search on the tract of real estate, and wherein the operations further comprise receiving title information data associated with the tract of real estate determined from the title search and updating the tax deed data stored in the database based at least in part on the title information data associated with the tract of real estate.

5. The system of claim 4, wherein the operations further comprise tracking changes to the tax deed data, wherein the operations further comprise indicating a status identifier for the changes to the tax deed data, and wherein the operations further comprise updating the status identifier based on at least one of receipt of the tax deed data, transmission of the application data, receipt of the parcel information data, updating the portion of the tax deed data, receipt of the title search data, transmission of the title search data, and receipt of the title information data.

6. The system of claim 5, wherein the status identifier indicates the amount of the fees associated with the tax deed application to be paid prior to issuance of the tax deed on the tract of real estate.

7. The system of claim 1, wherein the processor is in communication with at least one of the database and the user interface via a network.

8. The system of claim 1, wherein the tax deed data further comprises interest and fees associated with the tax certificate.

9. The system of claim 1, wherein the processor is in communication with at least one of a tax collector database and a property appraiser database.

10. The system of claim 1, wherein the processor is in communication with a property appraiser database and a tax collector database via a network.

11. A computer-based method of processing a tax deed application for an encumbered tract of real estate facilitated by a processor, the computer-based method comprising:
   receiving, by the processor, tax deed application data representative of the tax deed application;
   storing, by using the processor, the tax deed application data representative of the tax deed application in a database;
   transmitting the tax deed application data representative of the tax deed application to facilitate remote review of the tax deed application;
   receiving property information for the encumbered tract of real estate identified in the tax deed application after the remote review of the tax deed application has been performed;
   updating the tax deed application data in the database based at least in part upon the property information for the encumbered tract of real estate received, wherein the tax deed application data is updated by the processor;

updating a status identifier representative of a current status of the tax deed application based upon the property information for the encumbered tract of real estate received such that the current status of the tax deed application may be remotely monitored over a network, wherein the status identifier is updated by the processor;

determining an amount of fees associated with the tax deed application, wherein the amount of fees is associated with a tax deed on the tract of real estate, wherein the amount of fees is determined by the processor; and receiving electronic payment of the amount of fees associated with the tax deed application for the encumbered tract of real estate over the network.

12. The computer-based method of claim 11, wherein the tax deed application data comprises certificate information associated with a tax certificate associated with the encumbered tract of real estate, and investor information associated with the tax certificate.

13. The computer-based method of claim 12, further comprising:

transmitting a title search request for the encumbered tract of real estate via the processor for remote processing of the title search request;

receiving a title search result via the processor, the title search result reflecting results of the remote processing of the title search request;

updating the tax deed application data in the database based upon the title search result received; and updating the status identifier based upon at least one of the transmitting the title search request and the receiving the title search result.

14. The computer-based method of claim 12, further comprising identifying liens associated with the encumbered tract of real estate.

15. The computer-based method of claim 12, further comprising:

communicating with an electronic payment system via the processor to process a request for payment of total fees associated with the tax deed application; and receiving via the processor a notice from the electronic payment system to update the status identifier to include payment information.

16. A computer system for processing a tax deed application for an encumbered tract of real estate, the computer system comprising:

a processor configured to execute instructions to perform operations comprising:

receiving tax deed application data associated with the tax deed application for the encumbered tract of real estate over a network;

storing the tax deed application data;

receiving tax certificate data associated with a tax certificate on the encumbered tract of real estate;

determining an interest amount based at least in part on the tax certificate data associated with the tax certificate; and determining an amount of fees associated with the tax deed application, wherein the amount of fees is associated with a tax deed on the encumbered tract of real estate.

17. The system of claim 16, wherein the processor is configured to execute instructions to perform operations further comprising determining if the tax certificate is eligible for the tax deed application.

18. The system of claim 16, wherein the processor is configured to execute instructions to perform operations further comprising determining if additional tax certificates on the encumbered tract of real estate exist.

19. The system of claim 18, wherein the processor is configured to execute instructions to perform operations further comprising determining interest amounts for the additional tax certificates.

* * * * *